Feb. 7, 1933.    H. G. PALMER    1,896,097
BIRD CAGE
Filed Jan. 21, 1930

Inventor
Harry G. Palmer
By Rockwell & Bartholow
Attorneys

Patented Feb. 7, 1933

1,896,097

UNITED STATES PATENT OFFICE

HARRY G. PALMER, OF HAMDEN, CONNECTICUT, ASSIGNOR TO THE ANDREW B. HENDRYX COMPANY, OF NEW HAVEN, CONNECTICUT

BIRD CAGE

Application filed January 21, 1930. Serial No. 422,295.

This invention relates to cages and more especially to a bird cage and to improvements in the construction thereof.

It is usually necessary to rest a bird cage upon a table after removing the bottom for the purpose of cleaning, this in order that the bird housed therein will not escape. This invention contemplates an arrangement of parts whereby the bottom plate of a cage may be removed without the inconvenience of removing the cage from its support and setting it upon a table or the like.

One of the objects of this invention is to provide an improved bird cage of the drawer tray type that will be economical to manufacture and efficient in use.

Another object is to provide an improved form of base for a bird cage.

Another object is to provide an improved bird cage wherein the drawer tray may be readily received and supported above a removable bottom member in such a manner that the bottom member may be removed without affecting the disposition of the drawer.

To these and other ends, the invention consists in the novel features and combinations of parts to be hereinafter described and claimed.

Figure 1:
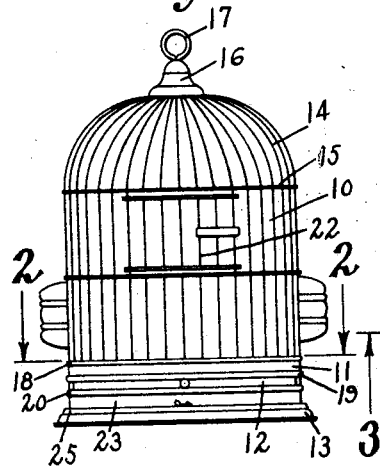
Fig. 1 is a front elevation of a bird cage embodying the features of this invention.
Figure 2:
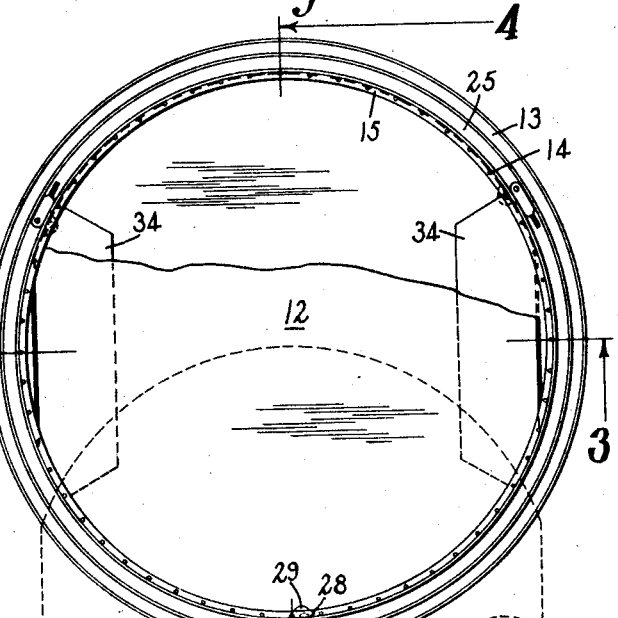
Fig. 2 is a section on line 2—2 of Fig. 1.
Figure 3:
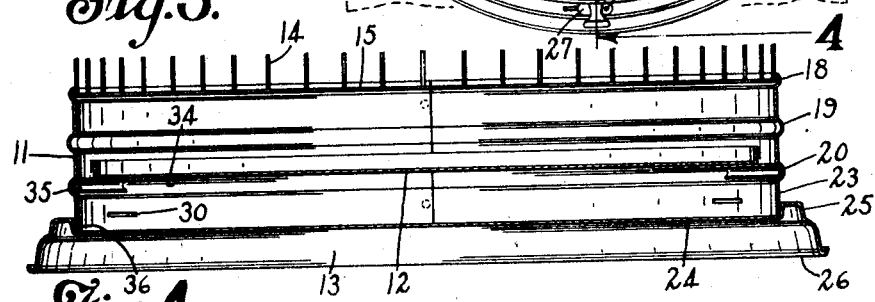
Fig. 3 is a section on line 3—3 of Fig. 2.
Figure 4:
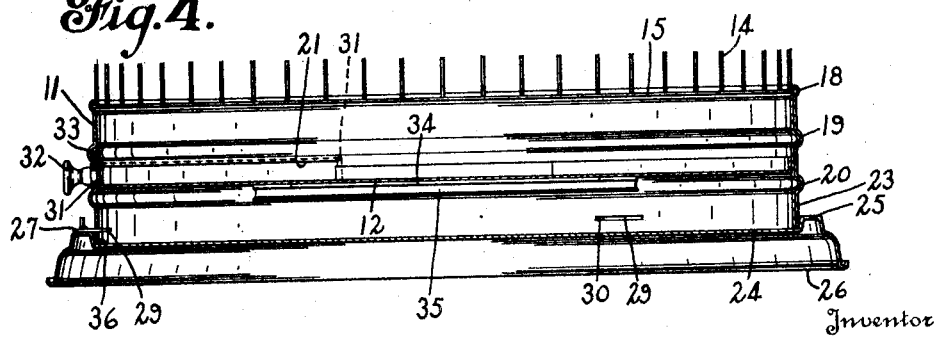
Fig. 4 is a section on line 4—4 of Fig. 2.

The bird cage selected to illustrate the features of this invention comprises a body 10, having a base portion secured thereto comprising a band 11, a drawer type tray 12, and a cage bottom member 13. The cage body 10 is formed by a plurality of vertically disposed circumferentially spaced apart wire rods 14 secured to horizontally spaced apart bars 15, the lowermost bar 15 being disposed at the lower ends of the rods 14. The upper ends of the rods 14 are brought together and secured beneath a top cap 16, which is secured to the cage body by means of an eyebolt 17.

The band 11 consists of a strip of material, preferably thin metal, which is curved, in the present instance, in the form of a cylinder, the ends thereof being brought together and spot welded or soldered to retain them in place. A series of ribs are formed in the band 11, the upper rib 18 forming a groove upon the interior surface of the band 11 in which the lowermost bar 15 is seated and retained to secure the cage body 10 to the band 11. The other ribs 19 and 20 are disposed below the rib 18, rib 20 being spaced upwardly from the bottom edge of the band 11, and rib 19 being disposed intermediate ribs 18 and 20. An opening 21 is provided in the band 11 and is disposed between the ribs 19 and 20. A door 22 of the usual form is provided in the cage body 10.

The lower edge 23 of band 11 rests upon a centrally disposed disk-like portion 24 of the cage bottom member 13. The cage bottom member 13 is preferably made of sheet metal and has an upwardly directed annular rib 25 formed therein about the disk-like portion 24. The material of the cage bottom member is extended downwardly from the outer periphery of the rib 25, to form a supporting edge 26 for the cage. Laterally swinging catches 27 pivoted at 28 upon the upper surface of the rib 25, are provided. Each catch 27 has an arm 29 that is adapted to pass through slots 30 provided in the band 11 to retain the band 11 in position upon the portion 24.

The drawer tray 12 is also preferably of sheet metal and is adapted to enter the opening 21, a front plate 31 being provided for the tray which extends beyond the opening at each end thereof in order to cover the same when the tray is in position within the band 11. A handle 32 is secured to the front of the drawer, being pivoted thereto and secured to a catch member 33. By turning the handle 32, the catch member 33 may be swung upwardly to engage the interior surface of the band 11 and retain the drawer tray 12 against removal therefrom.

The drawer tray 12 is supported upon inwardly directed and horizontally disposed shelves or flanges 34, that are secured upon the interior surface of the band 11. In this instance, two shelves or flanges 34 are provided, that are disposed diametrically opposite, one at either side of the opening 21. Preferably the flanges 34 extend forwardly beyond each end of the opening 21, so as to be engaged by the drawer tray 12 as it enters this opening whereby the same will be supported as soon as it enters the cage. In this instance, the flange members 34 are provided with a downwardly directed portion 35, that is formed to fit within the interior groove formed by the rib 20.

The provision of a removable drawer tray 12, and a removable cage bottom member 13, either of which may be removed from the cage without affecting the other, greatly facilitates the cleaning of the cage, it not being necessary to place the cage upon a table while so doing in order to prevent the bird, housed therein, from escaping. For instance, when a cage of the type illustrated, is suspended by the eye-bolt 17 from a suitable hanger, as most cages at present are, it is often inconvenient to remove the cage therefrom for the purpose of cleaning the same. This is especially so when the nearest table suitable to receive the cage is in another room. This inconvenience is obviated by applicant's novel form of base from which the bottom member 13 may be readily removed and cleaned while the tray 12 remains and acts as a bottom closure to prevent the escape of the bird. This feature is possible due to the novel arrangement of the cage parts, by the use of a tray that is substantially the same diameter as the cage portion 10, and by supporting the tray independently of the bottom member 13. When the bottom member 13 is replaced, the tray 12 may be readily removed for cleaning. The tray and bottom member, due to this arrangement, may be cleaned without the cage being removed from its supporting device or from its location in the house.

Extending the horizontally disposed flanges 34 forwardly beyond the ends of the drawer opening 21, and securing them in such position to the band 11, reenforces the band as well as facilitates the entering of the drawer tray therein. The cooperation of the lower edge 23 of the band 11 with an inwardly directed shoulder 36 formed by the annular rib 25, when the edge 23 is seated upon the disk-like portion 24, the provision of ribs 19 and 20, the former above and the latter below the drawer opening 21, reinforces the band 11 and tends to prevent the same from collapsing or excessively opening up at this point, and the provision of catches 27 that secure the band 11 to the cage bottom member 13, produce a sturdy, strong and efficient cage base structure.

By my novel arrangement and structure of the several portions of the bird cage, the manufacturing cost of the cage is substantially decreased while improving the efficiency and appearance of the cage. The strip of material forming the band 11 is wrapped tightly about the lowermost bar 15 and becomes permanently secured thereto when its ends are joined together. The lowermost bar 15 is adapted to slightly overhang the edges of the tray 12, insuring that waste material will fall thereupon. Due to this structure, there is no necessity of providing an inwardly directed flange upon the band 11 to overhang the tray edges for such purposes, as has been previously required in cages of this type. In view of this, the tray may be made substantially the same diameter about the greater part of its periphery as that of the cage portion 10.

While I have shown and described a preferred embodiment of my invention, it is understood that it is not to be limited to all of the details shown, but is capable of modification and variation which will lie within the spirit of the invention and the scope of the appended claims. I do not limit myself to the precise form and arrangement of the flange structure for supporting the drawer, as various changes may be made therein without departing from the claims.

What I claim is:

1. A bird cage base, comprising a strip of material bent about with its ends joined together, said strip having an opening in a side surface thereof disposed intermediate its upper and lower edges, and having an outwardly struck rib extending peripherally thereabout adjacent the upper edge and an outwardly struck rib extending peripherally thereabout adjacent the lower edge of the aforesaid opening, the lowermost rib presenting a groove in the interior surface of said strip, a drawer tray adapted to enter the opening in said strip, and a tray support having a part disposed in said groove and secured thereto, and another part extending inwardly away from the interior surface of said strip to support said drawer tray.

2. A bird cage base, comprising a curved strip of material with its ends joined together, said strip having an opening in a side surface thereof disposed intermediate its upper and lower edges, and having an outwardly struck rib extending peripherally thereabout adjacent the upper edge and an outwardly struck rib extending peripherally thereabout adjacent the lower edge of the aforesaid opening, the lowermost rib presenting a groove in the interior surface of said strip, a drawer tray adapted to enter the opening in said strip, and a tray support having a part disposed in said groove and secured thereto, and another part extending inwardly away from the interior surface of said strip to support said drawer tray, and a base bottom member detachably secured in engagement with the lower edge of said strip said drawer and said base bottom member each being separately removable from said strip without disturbing the other.

3. In a bird cage, a cylindrical cage body having a vertically disposed side wall, said side wall having an opening therein extending part way about its periphery, a removable tray insertable through the aforesaid opening, a removable closure member for the bottom edge of said cage body, said closure member and said tray each being separately removable from said cage body without disturbing the other, and a shelf secured to the inner surface of said side wall at each side of the opening therein, said shelves extending inwardly toward each other with the upper surface of each in substantial horizontal alignment with the lower edge of the opening in said wall, each of said shelves extending toward the opening in said side wall with a portion of each curved and conforming to said side wall between the extreme ends of the aforesaid opening, whereby said tray will engage and be supported by said shelves as it enters and after being inserted through the aforesaid opening.

4. In a bird cage, a substantially cylindrical cage body comprising a plurality of vertical wires and a base strip permanently attached to said wires and curved to present a cylindrical enclosure at the lower end of the cage body having an opening at the bottom thereof, a closure member for said opening comprising a dished disk-like element of greater diameter than said cage body having a down-turned peripheral flange and an upper portion engaging the lower edge of the cage body and extending across it in substantially the plane of said lower edge to close said body, means for removably securing said closure member to the cage body, said cage body being provided in a region substantially above the upper part of said closure member with a slot in its side wall adapted to receive a tray, a tray located in said slot, and shelf members for supporting said tray in position in the cage body attached to the side wall of the cage body in regions located substantially above the lower edge of the body.

In witness whereof, I have hereunto set my hand this 17 day of January, 1930.

HARRY G. PALMER.